United States Patent [19]

Diggs

[11] 4,078,771
[45] Mar. 14, 1978

[54] ROLLING ELECTRIC FENCE

[76] Inventor: Richard E. Diggs, S. 12A Rd., P.O. Box 776, Carthage, Mo. 64836

[21] Appl. No.: 675,699

[22] Filed: Apr. 12, 1976

[51] Int. Cl.$^2$ .............................................. A01K 3/00
[52] U.S. Cl. .................................. 256/10; 174/45 TD
[58] Field of Search ........ 256/10; 174/45 TD, 40 TD

[56] References Cited

U.S. PATENT DOCUMENTS

| 3,387,825 | 6/1968 | Kreeger | 256/10 |
| 3,482,820 | 12/1969 | Angello | 256/64 |

FOREIGN PATENT DOCUMENTS

| 2,144,587 | 3/1973 | Germany | 256/10 |

Primary Examiner—Doris L. Troutman
Attorney, Agent, or Firm—Fishburn, Gold & Litman

[57] ABSTRACT

An elongated strand of electric fence wire is provided with wheels whereby the strand can be rolled from one location to another while remaining stretched out lengthwise. The wheels also serve as posts whereby the strand of wire is held out of contact with the ground and at a desired elevation when in use. Each end of the wire can be attached to a portable holding means for anchoring the wire and which is also useful in moving the fence to a new location. When the fence is moved, the wheels roll and move with the wire, becoming rolling fence posts so that the wire does not snag an obstruction which may be lying on the ground or protruding from it.

14 Claims, 7 Drawing Figures

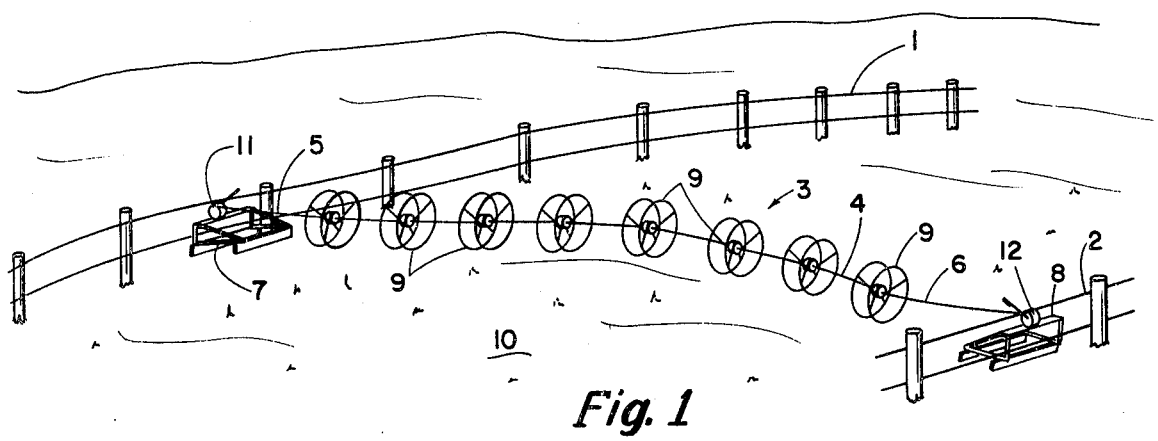
Fig. 1
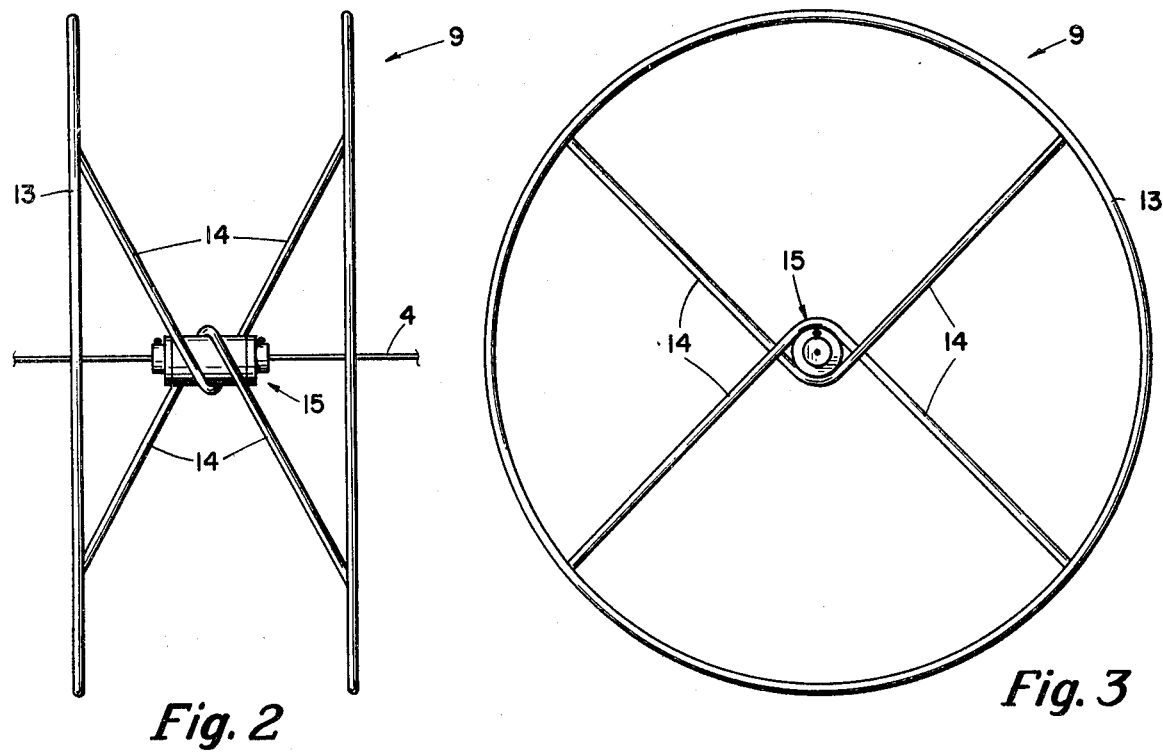
Fig. 2
Fig. 3
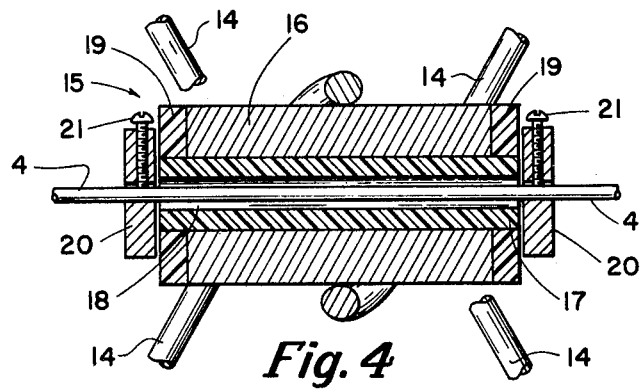
Fig. 4

ROLLING ELECTRIC FENCE

BACKGROUND OF THE INVENTION

This invention pertains to portable electric fences and more particularly pertains to an electric fence that can be rolled from one location to another while the electric fence wire remains stretched out and held up out of contact with the ground.

One of the more important aspects of dairy farming, beef production or any livestock program that includes pastures and forages is the need for moving the animals from one pasture area to another. This contributes toward obtaining maximum production, extends the life of the pasture, reduces the amount of compaction and trampling of the soil, and altogether substantially improves the caring capacity and profit on the project.

It is well known that stationary electric fences can be used for partitioning pastures into plots whereby livestock are periodically moved from one plot to another in order to obtain the previously mentioned benefits of such rotation. It will also be appreciated, however, that partitioning of pastures with stationary electric fences has considerable disadvantages which include the large amount of work, wire, apparatus and equipment required in building the numerous fences that are needed. In addition, operating within and between the small fields is difficult, and a considerable amount of time is required for moving the livestock from one field to another.

One object of the present invention is to provide a portable electric fence that will obviate the aforesaid disadvantages associated with building and using stationary fences.

Another object is to provide a rolling electric fence that can be rolled from one location to another while the electric fence wire is kept stretched out and above the surface of the ground during movement of the fence.

Still another object is to provide a rolling electric fence which can be moved while the livestock continue to be retained by the fence, thereby eliminating the need to move the livestock independently of moving the fence.

Yet another object is to provide a portable electric fence whereby the time and cost of moving livestock from one field to another is minimized.

Even another object is to minimize the time and costs of building and maintaining electric fences used for retaining livestock in a selected portion of a pasture.

Other objects and advantages of the invention will become apparent from the following description and the appended claims.

SUMMARY OF THE INVENTION

The present invention is a rolling electric fence having an elongated electrical conductor, e.g. a wire, that is mounted on a plurality of wheels that roll over the ground. The wheels are spaced apart from each other along the length of the conductor, and they support the conductor at a desired elevation above the surface of the ground. While remaining extended lengthwise, the conductor can be towed by its ends to a new location. During towing the wheels roll and are thus conveyed with the conductor. The wheels therefore serve as rolling fence posts during movement of the rolling electric fence from one location to another, so that disassembly and reassembly of the fence for the relocation thereof is not necessary.

BRIEF DESCRIPTION OF THE DRAWINGS

FIG. 1 depicts the present rolling electric fence in use between two stationary fence rows.

FIG. 2 is a front view of a fence-rolling wheel which can be used in the practice of the present invention.

FIG. 3 is a side view of the wheel shown in FIG. 2.

FIG. 4 is a sectional view of the hub of the wheel shown in FIGS. 2 and 3.

DESCRIPTION OF PREFERRED AND ALTERNATIVE EMBODIMENTS

Figure 6:
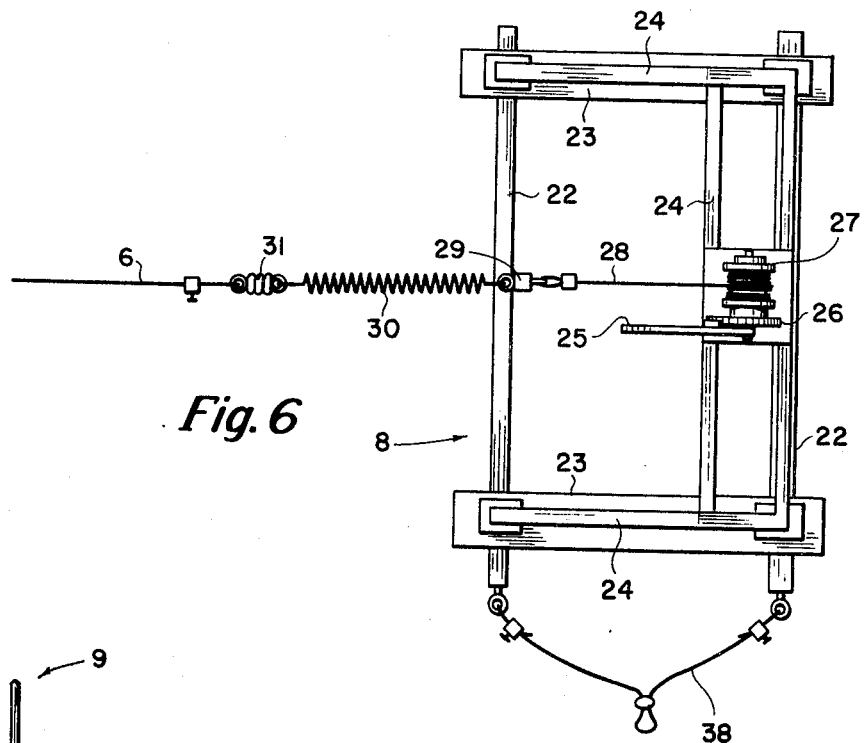
FIG. 6 is a top view of the vehicular skid shown in FIG. 5.

In FIG. 1, stationary fence rows which are spaced several hundred feet apart are depicted at 1 and 2. The rolling electric fence is generally represented at 3 and comprises an elongated, bare wire 4 having two ends 5 and 6 which are attached to towable skids 7 and 8, respectively. A plurality of wheels 9 rest on the surface of the ground 10, and the wire 4 passes through the hubs of the wheels. The ends 5 and 6 of the wire lead to winches 11 and 12 on the towable skids whereby the wire is tensioned or slackened as needed. The wheels 9 have a suitable diameter for maintaining wire 4 at an elevation above the ground which is selected as being effective for delivering minor shocks or stings to livestock which touch the wire, thus conditioning them to stay away from the wire and within the area bounded by the fence. Wheels 9 are spaced apart from each other along the length of the wire at intervals whereby sagging of the wire between the wheels is insignificant with respect to the selected elevation that should be maintained for effectively controlling the livestock.

When the rolling fence of FIG. 1 is to be moved, the wire can first be slackened if necessary by means of winches 11 and 12, and skids 7 and 8 can then be moved one at a time, or at the same time, by towing with a tractor in either direction substantially parallel to the stationary fence rows. This causes the wire 4 to move in the direction that the skids are towed, and as the wire is thus moved the wheels 9 are caused to roll over the ground and are thus conveyed with the wire. The wheels therefore serve as rolling fence posts since they continue to support the wire above the ground as it moves, thus preventing snagging of the wire on objects lying on the ground or protruding from it.

When the rolling of the electric fence to a new location has been completed, the skids 8 and 9 are repositioned against the stationary fence rows and the wire 4 is retightened by means of winches 11 and 12. It will be appreciated that moving of the electric fence as just described can be accomplished with relative ease and quickness, and it should also be pointed out that no disassembly or reassembly of fencing is required. Later description will make reference to use of two such rolling fences as are shown in FIG. 1 for making a four sided livestock enclosure, but it will be understood that only one rolling fence may be needed where three sides of an enclosure are stationarily fenced, or three, four, or even more rolling fences can be used, depending on the absence or presence of stationary fences, their number, and the shape of the pasture area to be fenced.

FIGS. 2 and 3 illustrate a wheel 9 that can be used with the rolling fence. Two hoops 13, which are spaced apart from each other laterally, can be formed from lightweight metal rod, tubing or pipe. The lateral spacing of the hoops is advantageously such that the wheels have good stability against the tendency to tip over when rolling across moderately bumpy or rolling ground, for otherwise they may bind on the wire 4 and resist rolling. The wheel 9 is provided with spokes 14 which are affixed at their inner ends to a hub, generally represented at 15, and at their outer ends to the hoops 13. Two of the four spokes shown are formed from one piece of lightweight metal rod, tubing or the like, whereas the other two spokes are also formed from one piece of such metal. As illustrated, the one piece of metal forming two spokes extends away from one hoop toward the hub, is bent over the hub at an angle of about 90°, and is then twisted so that it extends at an angle toward its connection with the other hoop. This provides a simple manner for forming a strong, inexpensive, easy-rolling wheel from metal.

Further details of the hub of the wheel are shown in FIG. 4. Spool 16 is a metal cylinder having a central bore therein which extends through the cylinder. An electrical insulating means in the form of a plastic tube 17 extends through the bore of the spool, and the inner bore 18 of the insulator is sized larger than the diameter of wire 4 so that wheel 9 can rotate around the wire. The ends of the spool can also be provided with plate insulators 19 made of plastic. The tubular insulator 17 can be press-fitted into spool 16 or else glued in place, whereas end plate insulators 19 can be glued or held in place with screws. Alternatively, the ends of tubular insulator 17 can be threaded externally and plate insulators 19 can be attached thereto by matching internal threads. Other forms and types of insulating means can be used, e.g. one piece insulators, and insulators made from glass, a ceramic, rubber, etc.

When the wheels 9 have been spaced on the wire 4 at desired intervals, they can be retained in place thereon by wheel retaining means, in the form of keepers 20, which in the illustrated case are made from a circular piece of metal or plastic having a central opening so that they can be strung on the wire. Lock screws 21 can be tightened for holding the keepers in place on the wire once they have been slid against the plate insulators 19 of the hubs. Other types of retaining means for maintaining the spacing of the wheels can be used where such is preferrable and practical.

Figure 5:
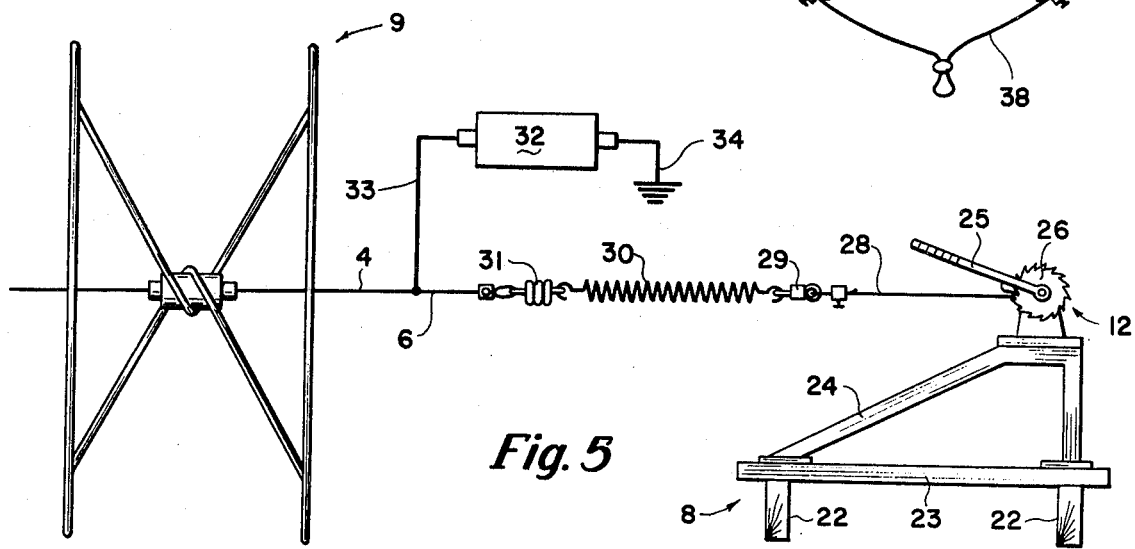
FIG. 5 is a front view of a vehicular skid which can be used as a holding means for the electrical conductor of the rolling fence shown in FIG. 1.

Referring now to FIG. 5, a towable skid 8 comprises runners 22 made of heavy wooden beams and which are held at a rather wide lateral spacing by wooden crossbraces 23 to prevent the skid from tipping over. A metal support frame 24 is attached to the skid and serves as a mount for winch 12. The illustrated winch is a hand operated, having a handle 25 and a ratchet and pawl arrangement 26 for turning a rotating winding drum 27. A length of cable 28 leads to drum 27 in winding relation thereto, and has a cable eye 29 at its outer end for attachment to one end of a coiled spring 30. The other end of the coiled spring is attached to an electrical insulating means, a ceramic insulator 31, which is in turn attached to one end 6 of wire 4. A fence charger is represented at 32, the hot wire 33 of which leads to the rolling fence wire 4 for the charging thereof. Line 34 of the charger is a grounding wire.

Winch 12 (and/or winch 11) serve as tensioning means whereby wire 4 is pulled at one end in a direction that is generally coaxial with respect to the lengthwise extension axis of the wire, thus providing means for removing slack from wire 4 and for applying tension thereto. Powered winches can be used as an alternative to hand winches, as can other types of hand winches, and also a variety of altogether different kinds of devices for removing slack and applying tension to the wire. The use of coiled spring 30 is optional but such can be advantageously employed to maintain desired tensioning of wire 4 while preventing over tensioning thereof as would damage or break the wire. Likewise, the use of insulator 31 is not essential, but its use is preferable for preventing accidental shocking of the operator of the winch.

Figure 7:
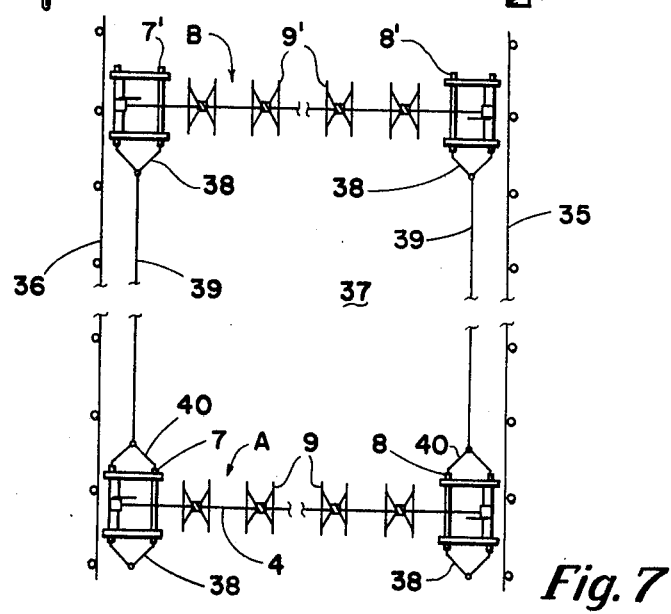
FIG. 7 illustrates use of two rolling electric fences between two stationary fence rows whereby livestock can be moved from one pasture area to another while remaining confined by a suitable enclosure.

In FIG. 7, two rolling electric fences, A and B, of the type shown in FIG. 1, are spaced apart from each other in generally parallel relationship between two spaced-apart stationary fences 35 and 36. A four-sided compound 37 thus exists within the confines of electric fences A and B and stationary fences 35 and 36. When it is desired to move livestock in the compound to a new section of pasture between the stationary fences, skids 7 and 8 are pulled forward by attaching the skid hitches 38 to a tractor. It will be noted that skid 8' of fence B is located directly behind skid 8 of fence A, and that these two skids are interconnected by a towing link 39, e.g. a cable, which extends from skid hitch 38' of skid 8' to the rear skid hitch 40 of skid 8. Skids 7 and 7' are also interconnected in this fashion with a towing link 39. Therefore, when skids 7 and 8 are pulled by a tractor, skids 7' and 8' are also caused to be towed by means of the interconnecting links 39, whereby both rolling electric fences A and B roll forward at the same time. This, in effect, creates a moving compound whereby the contained livestock are caused to move forward when fences A and B are moved forward, thus eleminating any need to move the livestock and the fences by separate operations.

It will be appreciated that various types of wire can be used as the electrical conductor 4 of the rolling fence. Ordinary electric fence wire can be used when strong enough to span the required distance and cause the wheels to roll and thus be conveyed when the fence is moved. Accordingly, braided wire or cable can be used as the electrical conductor to provide strength over long spans and during moving of the fence. Even small metal tubing or piping can be used as the electrical conductor 4 provided it is sufficiently flexible and durable enough to permit repeated bending of the fence up and down, and to some extent back and forth, as the fence is rolled over hilly or somewhat bumpy ground.

The invention has been described with particular reference to vehicular holding means, e.g. a towable skid, for anchoring the two ends of the electrical conductor 4 of the rolling fence. It will be understood, however, that practice of the invention in its broadest aspects does not require use of any form of holding means whereby the two ends of the conductor 4 are anchored during use of the fence. Such holding means can nonetheless be used to advantage in many instances and can be either portable or non-portable in form. When portable holding means are used they can be either more or less sophisticated than the towable skids which have been described. For instance, holding means that can be anchored and moved by hand can be used for first anchoring and then moving relatively small fences, whereas motorized vehicular holding means can be used for holding and moving large fences which are rolled to new locations relatively frequently.

FIGS. 2, 3 and 4 illustrate a lightweight metal wheel that can be used in the practice of the present invention, but it will be understood that suitable lightweight wheels can also be made from other materials, e.g. wood, plastic, or combinations of these materials with metal. When wheels molded from an electrically insulating plastic are used, the need for an electrical insulator at the wheel hub can be eliminated.

FIGS. 2, 3 and 4 also illustrate use of wheels having rotational axes which are aligned axially with respect to the lengthwise extension of the electrical conductor 4, and wherein the conductor is mounted on the wheels by passing it axially through a central opening in the hub of the wheel, with the central opening of the hub being sized for free rotation of the wheel around the conductor. It will be appreciated that such an arrangement of mounting the wire and the wheels is preferred because of its simple and practical nature. However, other types of mounting arrangements can also be used. The hub 15 can, for example, be stationarily attached to the wire and adapted for rotation of the wheel around the hub, i.e. an arrangement wherein the hub becomes the wheel axle instead of the conductor 4. In other arrangements the conductor 4 can be segmented, with each end of a segment being attached to a wheel 9 with a bearing, whereby the conductor does not pass axially through the hub of the wheel. In such cases rotary electrical conductors on the wheels can be used for maintaining flow of electricity along the length of the electric fence, but the wire need not pass through the hub, and the conductor 4 can be arranged to extend non-coaxially with respect to the hub of the wheel when such an arrangement is preferred. Even other arrangements of mounting the conductor on the wheels can also be employed.

It can be determined from the foregoing description that a rolling electric fence has been provided whereby the stated objects thereof can be attained. However, even though the rolling fence claimed herein has been described with reference to particular apparatus, combinations thereof, materials of construction, operational circumstances, and the like, it will nonetheless be understood that even other embodiments will become apparent which are within the spirit and scope of the invention defined in the following claims.

What is claimed and desired to secure by Letters Patent is:

1. A rolling wire fence comprising:
  (a) an elongated tensile member;
  (b) a plurality of wheel assemblies through which said tensile member axially extends, said wheel assemblies being spaced apart from each other along a length of said tensile member;
  (c) said wheel assemblies respectively including a pair of hoops laterally spaced apart on a common axial hub a distance sufficient to impart stability in rolling over the ground and means securing said hub to said hoops;
  (d) said hubs having longitudinal axial openings rotatably receiving said tensile member; and
  (e) wheel retaining means associated with said hubs preventing lateral sliding of said wheel assemblies along said tensile member and maintaining spacing thereof along said length.

2. A rolling wire fence as set forth in claim 1 where:
  (a) said hubs include electrical insulating means isolating said hoops from said tensile member.

3. A rolling wire fence as set forth in claim 2 wherein said electrical insulating means comprises:
  (a) a tubular insulator received in said axial opening and end plate insulators adjacent the ends of said tubular insulator.

4. A rolling wire fence as set forth in claim 1 wherein said wheel retaining means comprises:
  (a) keepers strung on said tensile member and having lock screws therein engaging and holding said keepers in position on said tensile member.

5. Apparatus as in claim 1 wherein said conductor has two ends and wherein each of said tensile member ends has a holding means attached thereto for anchoring the tensile member while it is extended lengthwise.

6. Apparatus as in claim 5 wherein said holding means is portable for moving said tensile member conductor from one location to another while the tensile member remains extended lengthwise.

7. Apparatus as in claim 5 wherein said holding means is vehicular.

8. Apparatus as in claim 7 and further comprising tensioning means on at least one of said vehicular holding means whereby said tensile member can be pulled from one end in a direction that is generally coaxial with respect to the lengthwise extension axis of said tensile member.

9. Apparatus as in claim 8 and further comprising a coiled spring, one end of which leads from said tensile member and the other end of which leads to said tensioning means.

10. Apparatus as in claim 8 wherein said tensioning means is a winch having a rotating winding drum thereon and wherein said tensile member leads to said drum in winding relation thereto.

11. Apparatus as in claim 7 wherein the vehicular holding means is a towable skid.

12. Apparatus as in claim 5 and further comprising insulating means whereby said tensile member is electrically insulated from said holding means.

13. Apparatus comprising a first rolling fence as in claim 1 and a second rolling fence as in claim 1, said tensile members conductors of said first and second fences extending generally parallel to each other, and wherein said first fence comprises a vehicular holding means located at a distance ahead of a vehicular holding means of said second fence, and further comprising a towing link between said vehicular holding means of the first fence and said vehicular holding means behind it of the second fence.

14. Apparatus as in claim 1 wherein said elongated tensile member is a wire being an electrical conductor.

* * * * *